Aug. 25, 1964

J. L. BIRD ETAL 3,145,511

GRINDING OR ABRADING TOOL

Filed Dec. 4, 1961

INVENTORS
Joseph L. Bird, &
BY Lloyd R. Oliver

Winnie, Barnard & McGlynn
ATTORNEYS

Aug. 25, 1964  J. L. BIRD ETAL  3,145,511
GRINDING OR ABRADING TOOL
Filed Dec. 4, 1961  2 Sheets-Sheet 2

INVENTORS
Joseph L. Bird &
BY Lloyd R. Oliver
Winnie, Barnard & McGlynn
ATTORNEYS though the particular tool or wheel to be described in detail hereinafter.

3,145,511
GRINDING OR ABRADING TOOL
Joseph L. Bird, 450 Lahser Road, Birmingham, Mich., and Lloyd R. Oliver, 8636 Robinwood, Utica, Mich.
Filed Dec. 4, 1961, Ser. No. 156,676
9 Claims. (Cl. 51—206)

This invention pertains to a tool for removing stock from a work piece and, more particularly, to a grinding or abrading tool or wheel.

While the present invention may be gainfully employed in many environments, as will be readily apparent to those skilled in the art as the description of the invention proceeds, it will facilitate an understanding thereof to refer to one particular use to which it may be put and the problems thereby overcome in the prior art. More specifically, the grinding or abrading tool or wheel to be hereinafter described has been particularly designed to solve certain problems arising in finishing automobile tires having a relatively narrow white or other colored circular stripe on the side wall of the casing thereof. According to present mass production techniques employed in the manufacture of tires of the type aforementioned, and reference will be made specifically to white wall tires by way of example, the all black side wall of the tire casing of suitable rubber material is molded with a white circular band or layer of suitable material approximately 1/16" below the exterior surface of the side wall; that is, the all black outer surface of the side wall covers the aforementioned white layer of material. The white layer is then exposed by grinding away the outer black surface of the side wall so as to form a sharp, uniform circular stripe on the side wall.

There may be two stages in the grinding operation, the first or roughing stage and the second or finishing stage. In the first stage, the white layer is exposed and the grinding carried practically to final dimensions using a relatively coarse grinding wheel. The second stage involves use of a fine grit wheel to erase marks of abrasion from the tire and to leave a smooth surface. The width and contours of the grinding wheels used must be accurately controlled so that a sharply defined stripe is made on the side wall of the tire casing. Until the advent of the present invention, these grinding operations have been carried out by using a solid steel wheel having its peripheral rim machined to the contour of the side wall of the tire, and tungsten carbide grits, suitably graded as to size, have been affixed to the peripheral rim of such wheels by means of a copper base brazing alloy. Tungsten carbide is used as the abrasive because of its abrasion resistance and toughness, and because it can be affixed to the wheel by brazing metals. Abrasion resistance is necessary to withstand the action of the various additives in the rubbr in the tire casing such as silica. The metallic bond of the abrasive to the rim of the wheel affords strength and efficient transfer of heat from the abrading surface or material to the wheel.

The solid steel grinding wheels aforementioned weigh up to ten pounds. As they are used continuously, they generate considerable heat and, due to their considerable mass, store such heat from one operation to the next. As a consequence, the temperature of the wheel rapidly builds up with very undesirable effects. For example, this temperature build-up very often causes ignition of small rubber particles which have been ground or abraded from the tire casing resulting in frequent and dangerous fires. As another example, this temperature build-up results in smearing of the rubber on the side wall of the tire and consequent lack of sharpness in the delineation of the white stripe. Furthermore, when this smearing occurs, the grinding wheel or abrasive surface thereof loads up and after a short time is no longer effective.

In addition to these problems caused by temperature build-up in the prior art solid steel wheels, still further problems are presented. For example, considerable time and effort must be expended in shaping the peripheral rim of such a solid steel wheel to the proper contour and with the proper accuracy so as to fit the curvature of the tire side wall from which the black layer of rubber is to be removed to expose the white stripe. Furthermore, due to its high mass, the speed of operation for a grinding wheel of this type is limited and presents balancing problems. Additionally, and very importantly at the temperature of brazing (above 1700° F.,) the solid wheels almost invariably distort, which causes failure to track, with further vibration. This distortion cannot be economically corrected.

It is, therefore, a principal object and feature of this invention to provide an improved tool for removing the stock from a work piece, and which tool is efficient and economical in operation.

It is yet another object and feature of this invention to provide an abrading or grinding tool or wheel characterized by a relatively low mass, thereby providing a relatively controlled build-up of temperature therein while removing stock from a work piece.

It is yet another object and feature of this invention to provide a grinding or abrading tool or wheel fabricated from thin-walled metal materials and preferably utilizing a suitable metallic bond to affix the abrasive material thereto to provide maximum heat transfer from the abrasive material to the tool or wheel.

It is yet another object and feature of this invention to provide a grinding or abrading tool or wheel of the type aforementioned characterized by fabricated thin-walled components which facilitate the shaping of the grinding or abrading surface to the desired contour with an extremely high degree of precision.

It is yet another object and feature of this invention to provide an abrading or grinding tool or wheel of the type aforementioned characterized by a relatively low mass, thereby presenting a minimum of balancing problems and, additionally in view of its mechanical strength, permitting very high cutting speeds.

It is yet another object and feature of this invention to provide a grinding or abrading tool or wheel constructed of relatively thin-walled materials having a low mass so as to provide a relatively controlled temperature build-up in the wheel, and further characterized by the use of suitable metallic bond to secure the abrasive material to the wheel for maximum heat transfer thereto, and means by which the wheel can readily dissipate such heat so as to be self-cooling.

It is yet another and more specific object and feature of this invention to provide an abrading or grinding wheel of the type aforementioned which may be readily disassembled particularly for renewal of the abrading surface thereof and, at the same time, may be manufactured readily to relatively precise contours and dimensions.

These and other objects, features and advantages of the invention will become more apparent hereinafter as the description of the invention proceeds, and in which reference is made to the drawings in which:

FIGURE 12 is a side elevation, in section to illustrate certain details, of a fourth preferred embodiment of the invention.

Further to facilitate an understanding of the present invention, the description thereof which follows will be made with reference on the first instance to the aforedescribed method of forming colored stripes in the side wall of a tire casing. However, it is again to be emphasized that the present invention has other uses and, consequently, is not to be limited by the following description.

Figure 1:
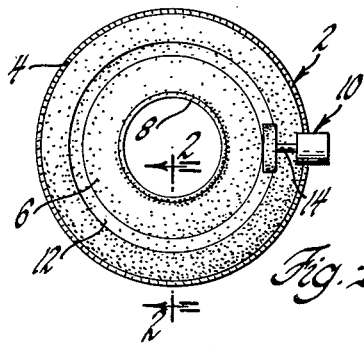
FIGURE 1 is a side elevation of a tire casing, and diagrammatically illustrates the use of a grinding wheel in removing a top coating or layer of black rubber material to expose a circular colored stripe.
Figure 2:
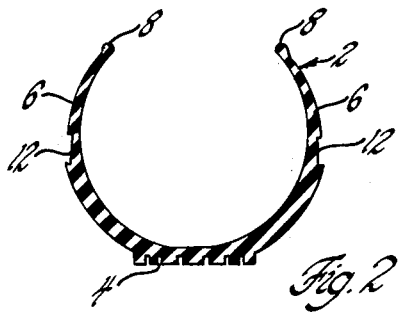
FIGURE 2 is an enlarged sectional view taken on a line 2—2 of FIGURE 1.

Referring now to the drawings, and particularly FIGURES 1 and 2 thereof, numeral 2 generally indicates a tire casing having the usual tread portion 4, black side walls 6 and inner beads or rims 8. As clearly shown in FIGURE 2, the side walls of the tire casing have a certain curvature, and one or both thereof are adapted to be brought by suitable well known machinery into engagement with a power-driven grinding wheel mechanism illustrated at 10 so as to grind away a certain thickness of the black outer layer of the side wall or walls so as to expose the layer of colored material, such as white rubber, and form the circular stripe indicated at 12. More specifically, according to one known manufacturing technique, a tire casing having been molded with the white circular layer of material covered by a black layer of rubber as aforedescribed is brought by a conveyer (not shown) to a finishing machine. Two plugs (also not shown) engage the openings in the tire casing defined by the beads 8 with an air tight seal, and the tire is then inflated. The tire is then rotated at approximately 300 r.p.m., and a roughing grinding wheel, rotating at approximately 4100 r.p.m., is brought into contact with the tire with the axis of the drive shaft 14 of the wheel perpendicular to the axis of rotation of the tire as illustrated in FIGURE 1. The rough grinding operation referred to above is continued until complete and the white layer is exposed. The roughing wheel is then removed from contact, and a finishing wheel as previously described is then brought into contact with the side wall or walls and finishes the tire.

Figure 3:
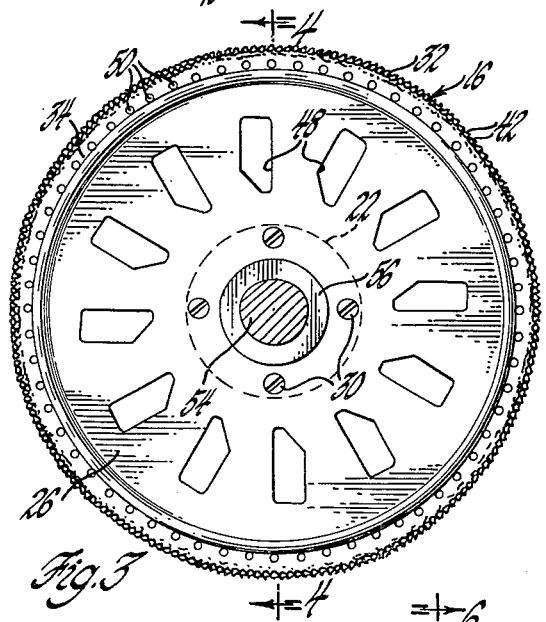
FIGURE 3 is a side elevation of one preferred embodiment of the grinding tool or wheel of this invention.
Figure 4:
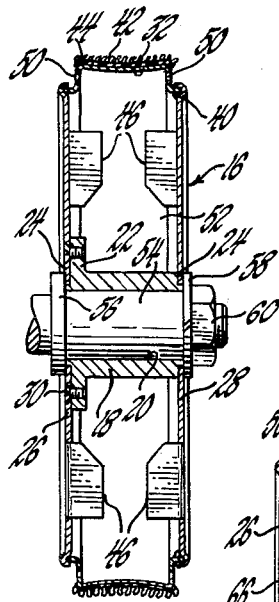
FIGURE 4 is a view taken on line 4—4 of FIGURE 3.
Figure 5:
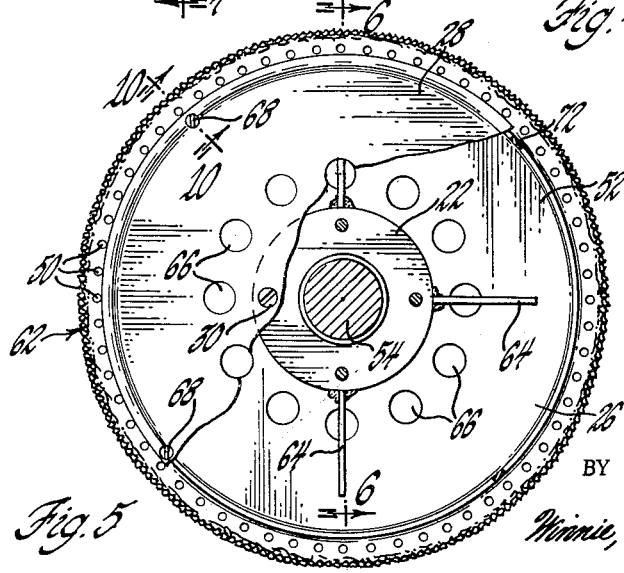
FIGURE 5 is a side elevation, partially broken away to show certain details, illustrating a second preferred embodiment of the invention.
Figure 6:
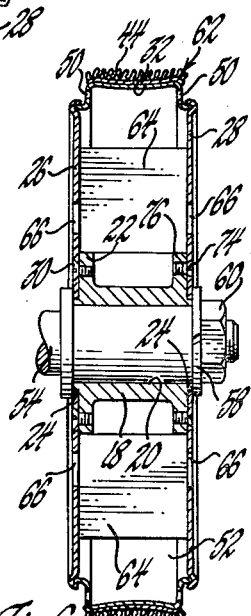
FIGURE 6 is a view taken on a line 6—6 of FIGURE 5.

Referring now to FIGURE 3 and 4 which illustrate one preferred embodiment of the present invention, it may be seen that the grinding wheel 16 comprises an axially extending cylindrical hub 18 having a cylindrical bore 20 extending axially therethrough, an annular radially extending flange 22 projecting outwardly from one end thereof, and a pair of axially spaced annular shoulders 24 on which the radially inner ends of the annular thin-walled metal cheek plates 26 and 28 are seated, the cheek plate 26 being in abutting engagement with the flange 22. As will be readily appreciated, the shoulders 24 retain the cheek plates in axially spaced relation while permitting axial movement of each cheek plate off its respective end of the hub 18. A plurality of suitable fasteners 30 extend between the one cheek plate 26 and the hub flange 22 so as to detachably secure these two members together.

Figure 9:
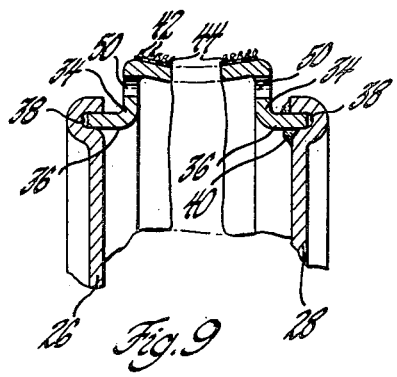
FIGURE 9 is an enlarged view of a portion of FIGURE 4.
Figure 10:
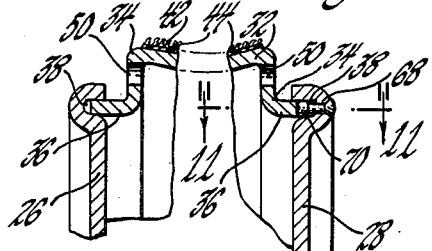
FIGURE 10 is an enlarged view taken on line 10—10 of FIGURE 5.
Figure 11:
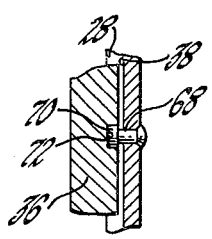
FIGURE 11 is a view taken on line 11—11 of FIGURE 10.
Figure 22:
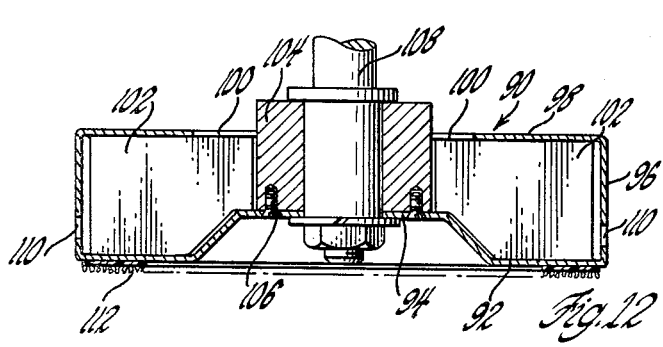

Referring now to FIGURE 9 in addition to FIGURES 3 and 4, an annular thin-walled metal rim plate 32 includes an intermediate curved portion corresponding to the curvature of the tire side wall or walls and, at each end thereof, a radially inwardly projecting rim flange 34 terminating in a laterally projecting shoulder 36. The rim plate 32 extends axially between the cheek plates 26 and 28, and the respective rim shoulders 36 are firmly seated within a continuous annular groove 38 formed in the radially outer ends of each of the cheek plates 26 and 28. The one rim shoulder 36 seated in groove 38 in cheek plate 28 is fixedly secured thereto by using any of the well known and suitable adhesive or bonding materials 40 such as solder a brazing alloy or epoxy cement which has stability up to approximately 350° F. While the other rim shoulder 36 may be similarly secured to the other cheek plate 26, it is not necessary and such rim shoulder is shown as merely being firmly pressed into the annular groove 38 in such cheek plate.

A suitable abrasive material in the form of suitably sized abrasive grits 42 is bonded to the external surface of the intermediate portion of the rim plate 32 by any suitable bond 44, and preferably a thermally conductive bonding material such as one of the well known metallic copper base brazing alloys.

Each of the cheek plates 26 and 28 is provided with a plurality of circumferentially spaced integral wing or vane members 46 pierced or otherwise formed laterally out of the plane of the respective cheek plates so as to form a series of circumferentially spaced relatively large air inlet openings 48. Furthermore, each of the rim flanges 34 is provided with a series of relatively small circumferentially spaced air outlet openings 50 immediately adjacent the surface of the intermediate portion of the rim plate 32 opposite the abrasive material bonded thereon.

As aforedescribed, the cheek plates 26 and 28 and rim plate 32 are of relatively thin-walled metal material as illustrated in FIGURES 3 and 4. Preferably these plates are fabricated of sheet steel approximately .050″ thick. However, the thickness of each of these plates is subject to variation depending upon the dimensional stablility and rigidity required in any given wheel fabricated for any given grinding or abrading operation, and consistent with the objective of providing a wheel having the lowest possible mass and as thin-walled plates as possible under the circumstances for purposes to be more fully apparent hereinafter. By way of example, instead of sheet metal cheek plates, as aforedescribed, precision machined plates about ⅜″ thick may be employed, thereby providing additional rigidity to the wheel if required, although not appreciably increasing the mass of the wheel and thickness of the plates.

In fabricating and assembling the grinding wheel of FIGURES 3 and 4, it should be readily apparent from the drawings that the cheek plates 26 and 28 are formed identically from identical pieces of sheet material or the like. Thereafter, the cheek plate 26 may be mounted on its shoulder 24 on the hub 18 and fastening means 30 secured in place to lock the cheek plate 26 to the hub 18. The rim plate 32 may then be placed in position in groove 38 of cheek plate 26, and the other cheek plate 28 mounted on its seating shoulder 24 on the hub while the groove 38 therein receives the other rim shoulder 36 of the rim plate. Also the cheek plate 28 is oriented so as to dispose the wing or vane means 46 substantially opposite to each other. The cheek plate 28 is then compressed axially toward cheek plate 26 using a suitable clamping device to firmly seat the rim plate shoulders 36 in grooves 38 of cheek plates 26 and 28 while firmly seating the latter on its shoulder 24 on hub 18. Thereafter, the adhesive, solder, brazing material or the like indicated at 40 is put in place to non-rotatively secure the rim plate 32 in torque-transmitting relation to the cheek plate 28. As a consequence, upon removing the wheel from the clamping device, the cheek plate 28 is held in position on the hub 18, and the hub, cheek plates and rim plate cooperate to form or define an internal annular chamber 52 in which the vane means 46 are circumferentially spaced. The wheel hub 18 may then be slipped on the end of a drive shaft 54 so as to abut the usual collar 56 thereon, and the usual washer 58 and nut 60 slipped on the other end of the drive shaft to mount and hold the wheel on the shaft for rotation with the latter.

The grinding wheel aforedescribed may be used, and is particularly adapted for use, in grinding tire side walls to expose the layer of white material therein to form a circular, highly delineated white or other colored stripe 12 thereon as previously described. As the wheel rotates, the wing or vane means 46 pumps the air contained within the chamber 52 and centrifugal force causes such air to move radially outwardly so as to impinge upon the internal surface of the rim plate 32 and flow out through the outlet openings 50. As air is being moved or pumped outwardly of the interior of the wheel, it is of course replaced by air passing through the openings 48 in the cheek plates. Thus, heat generated within the thin-walled rim plate 32 is dissipated due to the flow of air as aforementioned. As a consequence, the self-cooling action of the wheel as described retards a temperature rise in the wheel, and particularly the rim portion thereof, and the low mass of the rim and the wheel precludes storage of heat from one operation to the next.

Furthermore, in the event that the abrasive material 42 becomes ineffective due to wear, to damage, or the like, it is not necessary to completely replace the entire wheel 16 on the shaft 54. More specifically, it is only necessary to remove the nut 60 and washer 58 at the one end of the drive shaft 54, and then break the bond 40 between the rim plate 32 and cheek plate 28. If the bond 40 is of an adhesive material this may be accomplished by using a screw driver or the like to pry the groove 38 of the cheek plate 28 away from the rim plate shoulder 36, thereby breaking the bond of the material securing these two members together. Alternatively where using a metallic solder or brazing material having a low fusing temperature, the peripheral edge of the cheek plate 28 may be heated until such time as the bond softens. In either event, the cheek plate 28 is then readily axially removable from the hub 18 permitting removal of the rim plate 32, replacement thereof and reassembly of the wheel by the procedure previously described.

Reference will now be made to FIGURES 5, 6, 10 and 11 illustrating a grinding wheel 62 in accordance with another preferred embodiment of the invention, it being understood that like numerals are employed to indicate parts corresponding to those previously described. This embodiment of the invention differs from that previously described in eliminating the inwardly directed integral wings or vanes 46, and substituting therefor a plurality of vanes 64, herein shown to be four in number, equally circumferentially spaced around the chamber 52 within the wheel and extending between the cheek plates 26 and 28. The radially inner end of each of the vanes is suitably rigidly secured to the external surface of the hub 18 and extends radially outwardly to a point radially inwardly from the rim plate 32. In this embodiment, the air inlets are formed by a plurality of relatively large circumferentially spaced openings 66, herein indicated to be twelve in number.

The manner of detachably mounting the cheek plates on the hub 18 and positively connecting one of the cheek plates to the rim plate 32 for rotation therewith also differs from that previously described. More specifically, and referring particularly to FIGURES 10 and 11, a plurality of circumferentially spaced pins 68 are suitably rigidly secured in the groove 38 of the cheek plate 28 and each includes a head portion 70 extending laterally therefrom for axially interfitting engagement with corresponding notches 72 formed in the cooperating rim plate shoulder 36.

In assembling the grinding wheel 62 prior to installation on a drive shaft 54, the cheek plate 26 is secured to the hub 18 as previously described, the rim plate 32 is seated within the groove 38 in the cheek plate 26 also as previously described, and the cheek plate 28 then inserted on the hub so as to axially fit the head or lugs 70 of the cheek plate 28 into the corresponding notches 72, on the rim shoulder 36. Thereafter, additional fasteners 74 are applied to hold the cheek plate 28 rigidly to an additional flange 76 provided on the hub. The wheel may then be readily demountably supported on the drive shaft 54 as previously described.

The operation of this embodiment of the invention is substantially identical to that previously described, the vanes 64 serving to pump air through the inlet openings 66, through the chamber 52, against the rim plate 32 and out the outlet openings 50 so as to dissipate heat from the rim plate. Again, the low mass of the wheel and particularly the rim thereof precludes storage of heat from one operation to the next. If it is desired to replace the rim plate 32, it is merely necessary to disconnect the nut 60 and washer 58 from the drive shaft, disconnect the fasteners 74, move the cheek plate 28 axially off of its seat on the hub 18 to disengage the torque-transmitting connection formed by the lugs 70 and notches 72, and thereafter insert a new rim plate and reassemble the wheel as previously described.

Figure 7:
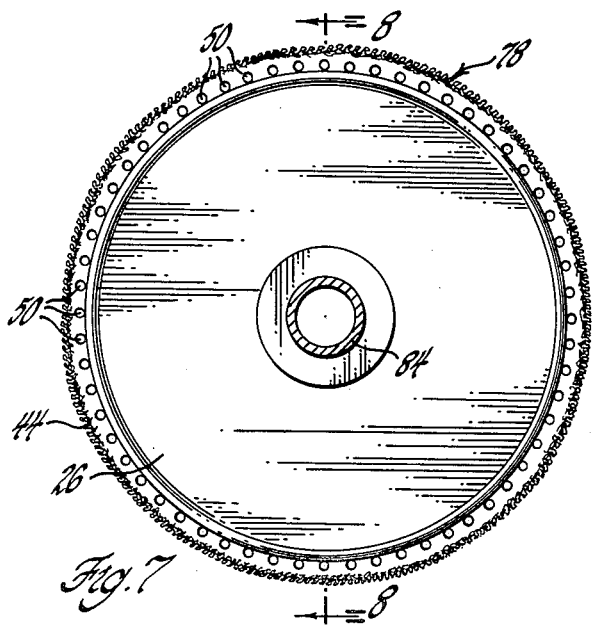
FIGURE 7 is a side elevation illustrating a third preferred embodiment of the invention.
Figure 8:
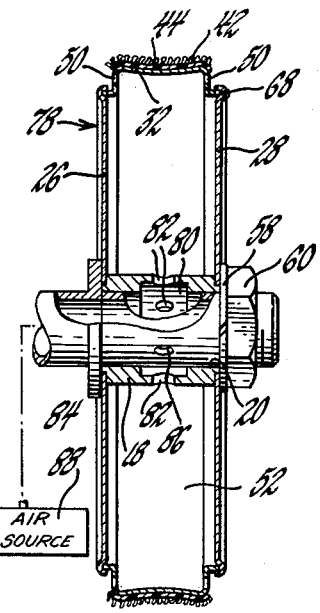
FIGURE 8 is a view taken on line 8—8 of FIGURE 7.

FIGURES 7 and 8 illustrate a grinding wheel 78 in accordance with yet another preferred embodiment of the invention, it again being understood that like numerals are employed to indicate parts corresponding to those previously described. In this embodiment, the cheek plates 26 and 28 do not include any air inlet openings, but rather the bore 20 of the hub 18 is provided with an axially extending recess or plenum chamber 80 in which there are provided a plurality of circumferentially spaced air inlet ports 82 communicating with the chamber 52 internally of the wheel. The pins 68 and cooperating notch construction previously described is employed to positively non-rotatably secure rim plate 32 to cheek plate 28. A hollow drive shaft 84, is insertable through the bore 20, and is provided with an annular collar 56 abutting check plate 26 and the nut 60 and washer 58 at the other end thereof compress the cheek plates axially together to hold the entire wheel assembly in rotating relationship with the hub 18 and drive shaft 84. The shaft 84 is provided with an annular series of openings 86 so as to supply air under pressure from a source indicated schematically at 88 through the openings 86 and 82 into the chamber 52. The axial extent of the recess 80 insures that the openings formed, respectively, in the hub 18 and shaft 84 do not need to be exactly aligned.

The operation of this wheel in regard to its self-cooling features is substantially identical to that previously described except for the fact that the air is preferably supplied under pressure so as to provide additional force to cause air flow through the wheel and against the rim plate 32 to cool the latter. Again, if it is desired to replace the rim plate 32, it is only necessary to detach the nut 60 and washer 58 at one end of the shaft 84, remove the cheek plate 28 axially from the hub to disconnect the lug and notch torque-transmitting connection associated with pins 68. Thereafter, a new rim plate may be inserted in place, the cheek plate 28 inserted axially upon the hub so as to interfit the lug and notch construction applied to compress the cheek plates together on the hub and retain the rim plate 32 in position to rotate with the cheek plates on the shaft 84.

FIGURE 12 illustrates yet another embodiment of the invention as applied to a disc type grinding wheel 90, as compared to the peripheral or rim type grinders previously described. More specifically, there is shown an annular thin-walled metal cheek plate 92 dished centrally to form a recessed annular flange 94, a thin-walled metal annular rim plate 96 and a second thin-walled metal annular cheek plate 98. The rim plate 96 extends between the cheek plates 92 and 98 and is suitably rigidly secured thereto. As will be readily apparent, the rim plate 96 and cheek plates 92 and 98 may be formed integrally with each other from a single sheet of material by using any suitable metal-forming operation to bend the material into the relationship shown in the drawings. The cheek plate 98 does not extend radially as far as the flange 94 of cheek plate 92 so as to form a continuous annular opening 100 about the central axis of the grinding wheel. A plurality of circumferentially spaced vanes 102 are suitably rigidly secured between the cheek plates and preferably to the cheek plate 98, and each extends between the rim plate and a hub 104 although some clearance is provided between the vanes and the hub and rim plate. A plurality of fasteners 106 are adapted to connect flange 94 and one end of hub 104 to demontably support the entire wheel construction on the hub 104. The hub may be mounted on a drive shaft 108 as previously described. A plurality of relatively small annularly spaced air outlet openings 110 are provided about the rim plate 96 immediately adjacent the peripheral edge of the cheek plate 92. An annular band 112 of a suitable abrasive is again bonded or otherwise secured, preferably by a metallic based bond, to the external surface of the cheek plate 92.

In the operation of this embodiment, as the grinding wheel is rotated by the shaft 108, the vanes 102 pump air across the surface of the cheek plate 92 and out the air outlet openings 110, new air being taken into the grinding wheel through the annular opening 100. As a consequence of the air flow across the surface of the cheek plate 92 and through the air outlet openings 110, the grinding surface 112 is cooled and, again due to the thin-walled construction and low mass of the wheel, storage of objectionable heat from one operation to the next is precluded.

In view of the foregoing description, it will be immediately apparent that the relatively low mass of the grinding or abrading tool or wheel of this invention provides a controlled build-up of temperature. Furthermore, due to the thin nature of the materials used in the rim plates or the cheek plates which carry the abrasive, there is a maximum heat transfer which is additionally materially enhanced when a metallic bond is used to affix the abrasive to the body of the tool or wheel as in the preferred embodiments. Furthermore, because of the thin-walled nature of the portion of the wheel to which the abrasive material is applied, such surface can be made to any reasonable contour with a high degree of precision which is particularly important when manufacturing white wall or other colored side wall tires as previously described. Additionally, the low mass of the wheel of this invention, coupled with its mechanical strength, permits very high speed operation and very high surface cutting speeds far in excess of conventional systems and with a minimum of balancing problems.

Finally, due to the fabricated nature and multi-piece construction described, the wheel may be readily assembled and disassembled, which is particularly significant with respect to replacing the abrading or grinding surface of the wheel.

While several forms of the invention have been shown and described, other forms will now be apparent to those skilled in the art. Therefore, it will be understood that the embodiments shown in the drawings are merely for illustrative purposes, and are not intended to limit the scope of the invention which is defined by the claims which follow.

We claim:
1. A grinding wheel comprising an axially extending hub having a bore therein adapted to receive a drive shaft, a pair of annular radially extending thin-walled metal cheek plates in axially spaced relationship along said hub, an annular axially extending thin-walled metal rim plate extending axially between the radially outer ends of said cheek plates and including radial flanges at each end thereof, means connecting said hub, cheek plates and rim plate for rotation together and to form a chamber within said wheel, an abrasive, thermally conductive means securing said abrasive to said rim plate between said flanges externally of said chamber, air inlet means in said wheel communicating with said chamber, and air outlet means in at least one of said flanges of said rim plate communicating with said chamber whereby, during rotation of said wheel by a drive shaft, air may flow through said air inlet means into said chamber and across the surface of said rim plate internally of said chamber and through said air outlet means to dissipate heat from said rim plate.

2. The invention as defined in claim 1 in which said air inlet means is located in at least one of said cheek plates between said hub and said rim plate.

3. The invention as defined in claim 1 in which said air inlet means is located in said hub and communicates the bore of the latter with said chamber, whereby said hub may be mounted on a hollow drive shaft having a plurality of air openings communicating with said air inlet means for supplying air through said shaft into said chamber.

4. The invention as defined in claim 1 in which said air inlet means includes an axially extending annular recess within the bore of said hub and a plurality of circumferentially spaced air openings communicating said recess with said chamber, whereby said hub may be mounted on a hollow drive shaft having a plurality of air openings registering with said recess for supplying air through said shaft into said chamber.

5. The invention as defined in claim 1 further comprising a plurality of circumferentially spaced vanes struck inwardly from said cheek plates into said chamber substantially opposite from each other to form said air inlet means.

6. A grinding wheel comprising an axially extending hub having a bore therein adapted to receive a drive shaft, a pair of annular radially extending thin-walled metal cheek plates in axially spaced relationship along said hub, an annular thin-walled metal rim plate extending axially between the radially outer ends of said cheek plates and including radial flanges at each end thereof, detachable means connecting said hub, cheek plates and rim plate for rotation together and to form a chamber within said wheel and being detachable to permit relative axial movement of said cheek plates for removal of said rim plate from therebetween, an abrasive, thermally conductive means securing said abrasive to said rim plate between said flanges externally of said chamber, air inlet means in said wheel communicating with said chamber, a plurality of relatively small circumferentially spaced air outlet openings in both of said flanges of said rim plate and communicating with said chamber whereby, during rotation of said wheel by a drive shaft, air may flow through said inlet means into said chamber across said rim plate internally of said chamber and through said outlet openings to dissipate heat from said rim plate.

7. The grinding wheel as defined in claim 6 wherein said detachable means comprises a detachable torque-transmitting connection between said rim plate and at least one of said cheek plates.

8. The grinding wheel as defined in claim 7 in which said torque-transmitting connection comprises a breakable bond.

9. The grinding wheel as defined in claim 7 in which said torque-transmitting connection comprises an axially interfitting detachable lug and notch connection between said rim plate and at least one of said cheek plates.

References Cited in the file of this patent

UNITED STATES PATENTS

| | | |
|---|---|---|
| 2,198,282 | Hall | Apr. 23, 1940 |
| 2,320,130 | Harris | May 25, 1943 |
| 2,442,129 | Hollstrom | May 25, 1948 |
| 2,608,035 | Tullo | Aug. 26, 1952 |
| 2,616,228 | Schlegel | Nov. 4, 1952 |
| 2,633,680 | Goldberg | Apr. 7, 1953 |
| 2,700,853 | Titcomb | Feb. 1, 1955 |
| 2,906,612 | Anthony et al. | Sept. 29, 1959 |
| 2,958,118 | Neilsen | Nov. 1, 1960 |
| 2,982,006 | Booth | May 2, 1961 |

FOREIGN PATENTS

| | | |
|---|---|---|
| 423,067 | Germany | Dec. 22, 1925 |
| 138,689 | Australia | Sept. 28, 1950 |